UNITED STATES PATENT OFFICE.

AISIK KREIDMANN, OF ALTONA, GERMANY.

PROCESS OF MAKING SOLUBLE COMPOUNDS OF QUININ AND CAFFEIN.

SPECIFICATION forming part of Letters Patent No. 660,859, dated October 30, 1900.

Application filed May 21, 1900. Serial No. 17,454. (No specimens.)

*To all whom it may concern:*

Be it known that I, AISIK KREIDMANN, a subject of the King of Roumania, residing at Altona, in the Kingdom of Prussia and Empire of Germany, have invented certain new and useful Improvements in Processes of Making Soluble Preparations of Quinin and Caffein, of which the following is a specification.

In Letters Patent No. 625,886, granted me May 30, 1899, I have described and claimed a process wherein hydrochlorate of quinin and neutral caffein are repeatedly dissolved, crystallized, remixed, dissolved, and again crystallized for the purpose of producing a readily-soluble preparation.

In the present invention through the peculiar treatment of the two component parts a liquid is formed which solidifies in a mass after cooling and is then ready for pulverization and use. The preparation obtained in this manner has the same peculiarities which render the preparation manufactured according to the original process valuable for medical purposes.

The most simple manner to manufacture the preparation, readily soluble in water, containing caffein and quinin is according to this process explained by an example, the following: Two hundred grams of quinin chlorid and one hundred grams of caffein are sufficiently ground and the mixture placed in a glass matrass or any other suitable receptacle. The vessel with its contents while being stirred and shaken is carefully heated until the mass, at about 225°, becomes melted and liquid. The liquid is then poured out and cooled off. After being cooled the mass is pulverized, and thereby ready for using. In order to bring this preparation in crystal form, the obtained mass is dissolved in a solvent—for instance, hot water—and the water allowed to evaporate in a moderate temperature, by which a loose mass of crystals is obtained.

At the melting process or the process of the combining of the two constituents a small quantity of water or any other indifferent liquids may be added to the mixture of quinin chlorid and caffein.

Another way of obtaining the same product is the following: Two hundred grams of quinin chlorid and one hundred grams of caffein are dissolved together, for instance, in one hundred grams of chloroform, ether, ether alcohol, or the like. After having arrived at the solution the solvent is to be allowed to evaporate or can be removed by way of distillation. The residuum consists of the same readily-soluble preparation containing quinin and caffein.

Further experiments have proved that soluble combinations with caffein can be obtained not only by using quinin chlorid, but that quinin chlorid can be partially or wholly replaced by quinin bromid or iodid. Consequently quinin bromid or iodid can be used partially or wholly instead of quinin chlorid. Naturally it therefore does not make any difference if, for instance, instead of quinin chlorid, quinin and the corresponding quantity of muriatic acid, or, instead of that, quinin and caffein chlorid in the quantities necessary through this change, are used.

What I claim, and desire to secure by Letters Patent, is—

The process herein described, consisting in melting together by heat about two parts of quinin chlorid and one part of caffein and cooling the resultant in a solid uncrystallized mass.

In witness whereof I have hereunto set my hand in presence of two witnesses.

AISIK KREIDMANN.

Witnesses:
   E. H. L. MUMMENHOFF,
   OTTO W. HELLMRICH.